(12) United States Patent
Echegaray et al.

(10) Patent No.: US 8,171,442 B2
(45) Date of Patent: May 1, 2012

(54) METHOD AND SYSTEM TO AT LEAST PARTIALLY ISOLATE NETS

(75) Inventors: Alexandra Echegaray, Poughkeepsie, NY (US); Heidi L. Lagares, Poughkeepsie, NY (US); Douglas S. Search, Poughkeepsie, NY (US); Stephen Szulewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/557,872

(22) Filed: Sep. 11, 2009

(65) Prior Publication Data

US 2011/0066989 A1 Mar. 17, 2011

(51) Int. Cl.
*G06F 17/50* (2006.01)

(52) U.S. Cl. ........ 716/115; 716/108; 716/113; 716/114; 716/126; 716/134; 703/19

(58) Field of Classification Search .................. 716/108, 716/113, 114, 115, 126, 134, 135; 703/19
See application file for complete search history.

(56) References Cited

U.S. PATENT DOCUMENTS

| | | | |
|---|---|---|---|
| 6,018,623 A | 1/2000 | Chang et al. | |
| 6,138,267 A | 10/2000 | Murai | |
| 6,539,527 B2 | 3/2003 | Naffziger et al. | |
| 6,546,529 B1 | 4/2003 | Dansky et al. | |
| 6,907,586 B1 | 6/2005 | Al-Dabagh et al. | |
| 6,990,420 B2 | 1/2006 | Guo et al. | |
| 7,017,130 B2 | 3/2006 | Lee et al. | |
| 7,093,223 B2 | 8/2006 | Becer et al. | |
| 7,181,711 B2 | 2/2007 | Foreman et al. | |
| 2004/0243956 A1* | 12/2004 | Tetelbaum et al. | 716/6 |
| 2005/0091621 A1* | 4/2005 | Goldberg et al. | 716/6 |
| 2006/0143584 A1* | 6/2006 | Carrere et al. | 716/5 |
| 2008/0155490 A1 | 6/2008 | Tang et al. | |
| 2008/0301610 A1* | 12/2008 | Ushiyama et al. | 716/8 |
| 2009/0106724 A1* | 4/2009 | Arsovski et al. | 716/7 |

* cited by examiner

*Primary Examiner* — Thuan Do
*Assistant Examiner* — Nha Nguyen
(74) *Attorney, Agent, or Firm* — Cantor Colburn LLP; William A. Kinnaman, Jr.

(57) ABSTRACT

A method to at least partially isolate a net of a circuit design is provided and includes testing a timing characteristic of a circuit design, identifying from a result of the testing a net of the circuit design to be at least partially isolated from an adjacent net and determining a percentage of the identified net to be partially isolated.

18 Claims, 4 Drawing Sheets

METHOD AND SYSTEM TO AT LEAST PARTIALLY ISOLATE NETS

BACKGROUND

Aspects of the present invention are directed to a method to partially isolate nets to provide noise immunity.

On a typical chip or circuit design with millions of gates, nets and timing paths, an important design consideration is to prevent noise from certain nets from impeding signal propagation in other nets and thereby negatively affecting the timing of those nets. This consideration is, in fact, so important that in most cases the vast majority of late model timing paths of chips will be designed so carefully as to meet their timing requirements even if all the nets on the chip were being subjected to the maximum amount of coupled noise from adjacent nets.

Recently, a method of achieving correct timing in late model timing paths has been to conduct noise-induced timing violation sensitivity (NITVS) tests. The intent of NITVS tests is generally to identify and isolate only those nets that require wiring isolation to preclude coupled noise from negatively affecting the timing of the chip.

Unfortunately, there are drawbacks to such tests and to the isolation of a large number of nets. Among these is the fact that the chip being tested may have limited wiring resources available and that isolated nets use three times the wiring tracks that regular nets use and can increase wiring congestion. In addition, there may already be relatively high wiring congestion on some areas even without net isolation. In some cases, these areas can also be the most timing critical areas of the chip. Revisions of the chip design when wiring resources are limited and/or where congestion occurs can be complicated and time consuming.

SUMMARY

In accordance with an aspect of the invention, a method to at least partially isolate a net of a circuit design is provided and includes testing a timing characteristic of a circuit design; identifying from a result of the testing a net of the circuit design to be at least partially isolated from an adjacent net and determining a percentage of the identified net to be partially isolated.

In accordance with another aspect of the invention, a method to at least partially isolate a net of a circuit design is provided and includes conducting a first timing run of the net while applying a first amount of coupled capacitance relative to the net, conducting a second timing run of the net while applying a second amount of coupled capacitance relative to the net and determining whether and to what degree the net is to be isolated based upon a comparison of the first and second timing runs.

In accordance with another aspect of the invention, a system to at least partially isolate a net of a circuit design is provided and includes a testing apparatus conductive of first and second timing runs of the net while respectively applying first and second amounts of coupled capacitance relative to the net and a processor, coupled to the testing apparatus to be receptive of results of the first and second timing runs, by which a comparison of the results and determinations based upon the comparison as to whether and to what degree the net is to be isolated are made.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

With reference to FIGS. 1-4, aspects of the present invention are directed to a method for calculating a required percentage of partially wired nets by modeling net performance as it is affected by one and then two aggressors. Such modeling may allow for a prediction as to how much, if any, of an isolation percentage specific nets require. Such a prediction could serve to guarantee or, at least, substantially increase the likelihood of positive slack being found for that net after coupling.

In general, the modeling involves adding wire capacitance onto nets to emulate the potential impediments to a signal traveling along the nets. The wire capacitance will tend to slow the signal and first timing data, which is reflective of the time required for the signal to traverse the net, is recorded. Additional estimated wiring capacitance is then used to emulate maximum expected coupling in a "worst case scenario" second timing run. The additional estimated wiring capacitance will slow the signal further and second timing data, which is reflective of the additional time required for the signal to traverse the net, is recorded. The first and second timing data are compared and a result of the comparison can be used to forecast an amount, if any, of partial wiring isolation required by each net. That is, the result of the comparison will indicate that some nets require no isolation, that others will require complete isolation and that some nets will require only partial wiring isolation. In these nets, only a percentage of their length is isolated from other nets.

By forecasting the partial wiring isolation required by each net, the need to fully isolate nets that require only some partial level of isolation is avoided. Wiring resources are therefore not wasted, wiring congestion can be minimized, and positive slack for nets can be achieved.

Figure 1:
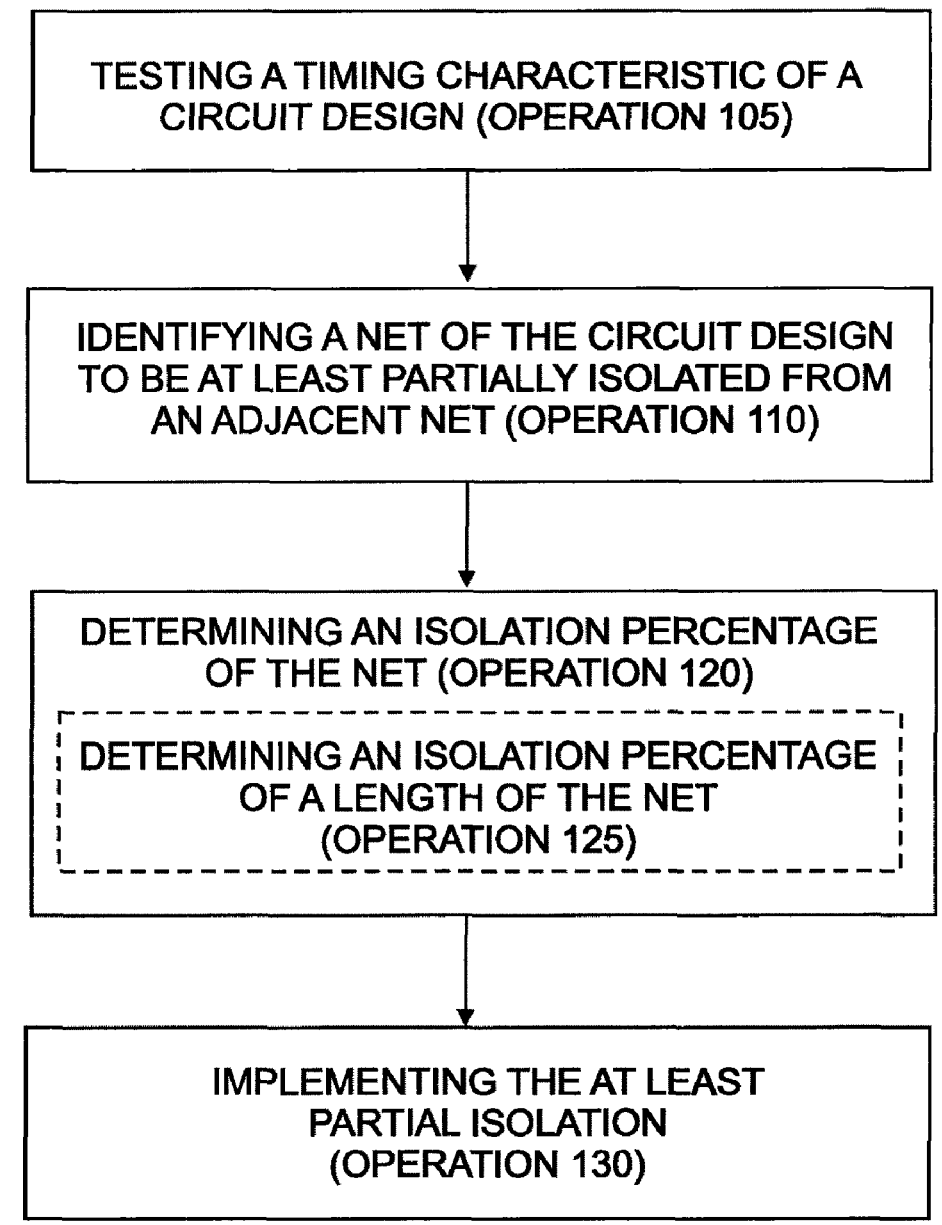
FIG. 1 is a schematic illustration of a method in accordance with embodiments of the invention.

With reference to FIG. 1 and, in accordance with an embodiment of the invention, a method 100 is provided. The method 100 includes testing a timing characteristic of a circuit design 105, identifying from a result of the testing a net of the circuit design to be at least partially isolated from an adjacent net 110 and determining a percentage of the identified net to be partially isolated 120. The determining may include determining an estimated percentage of a length of the identified net to be partially isolated 125. The method may further include implementing the at least partial isolation of the identified net 130. As mentioned above, the execution of method 100 can serve to reduce coupled noise in a net of a chip or a circuit including the net to thereby prevent an at risk net from negatively affecting timing and can allow for wiring resources to be made available.

Figure 2:
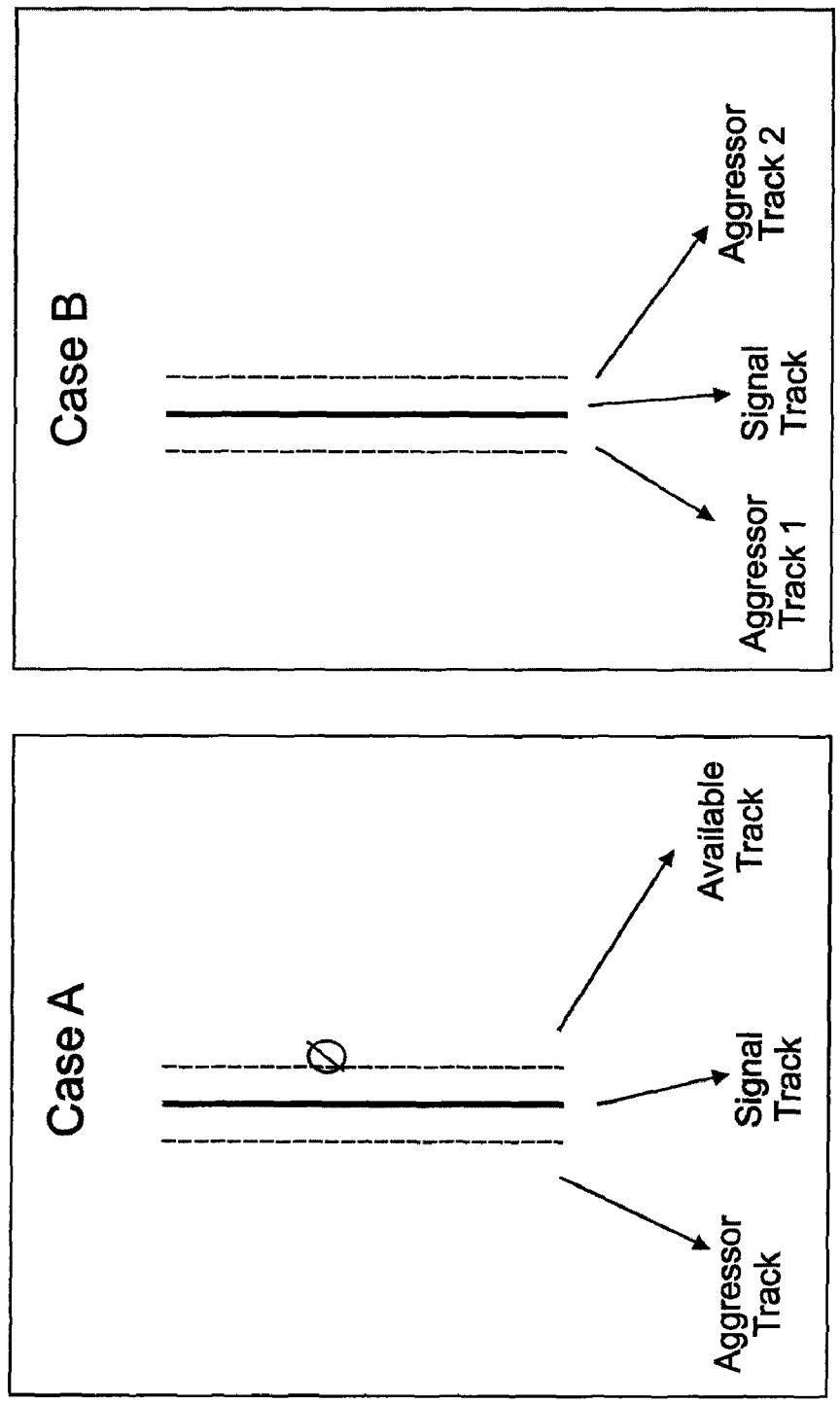
FIG. 2 is a schematic illustration of a signal track being tested with one and two adjacent aggressor tracks in accordance with embodiments of the invention.

With reference to FIG. 2, a method to partially isolate a net of a circuit design is provided and includes initially conducting a first or baseline timing run of the net while applying a first or default amount of coupled capacitance relative to the net. This is shown schematically in FIG. 2 in the "Case A" example. Here, the "signal track" represents a net being tested, the "aggressor track" represents the default amount of coupled capacitance being applied to the signal track and the "available track" is unused (see symbol, ø). The default amount of coupled capacitance may model a coupled capacitance or noise of a single net which would be adjacent to the net in the circuit design. A result of the baseline timing run may be recorded in, for example, a memory 430 of a computing device such as system 400 (see FIG. 4), as will be described below. The recording operation may employ the use of, for example, Steiner wired timing data.

A second or estimated coupling capacitance timing run of the net is also conducted. Here, a second or estimated amount of coupled capacitance is applied relative to the net. This is shown schematically in FIG. 2 in the "Case B" example in which both adjacent nets are seen as "aggressor tracks 1 and 2". The estimated amount of coupled capacitance may model a coupled capacitance or noise of two nets which would be adjacent to the net in the circuit design. As above, the result of the estimated coupling capacitance timing run is recorded in the memory 430.

A determination of whether the tested net is to be isolated is made and, if the net is to be isolated, a further determination is made as to a degree of isolation the net requires. These determinations are made based upon a comparison of results of the baseline and estimated coupling capacitance timing runs that could be accomplished by way of a processor 450 (see FIG. 4).

Figure 3:
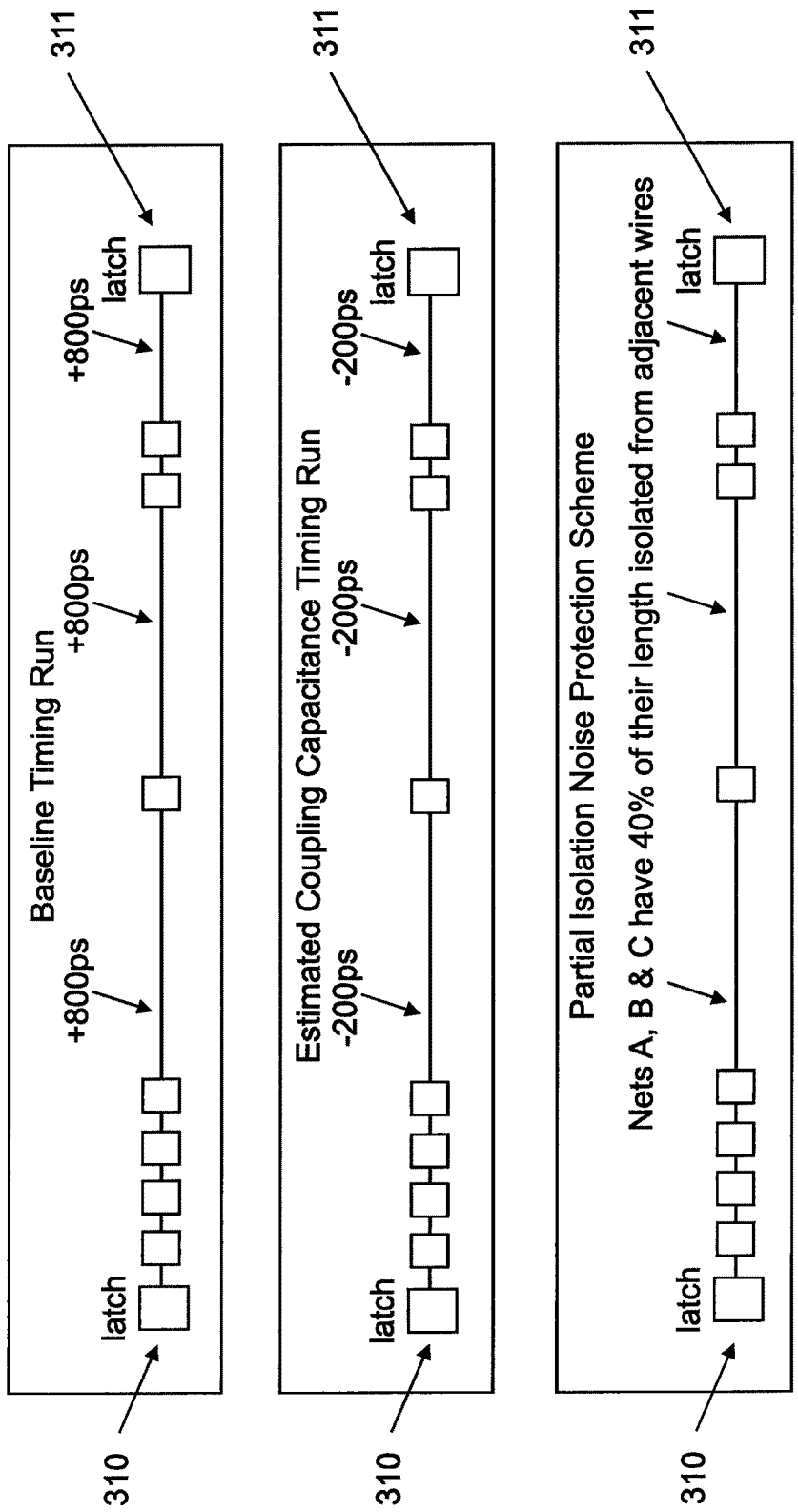
FIG. 3 is a schematic illustration of result of tests of a net in accordance with embodiments of the invention.

With reference to FIG. 3, the determinations may include determining that no wiring isolation is necessary in an event the net meets a slack target for the estimated coupling capacitance timing run, determining that full wiring isolation is necessary in an event the net fails to meet a slack target for the baseline timing run, or determining that partial wiring isolation is necessary in an event the net meets a slack target for the baseline timing run and fails to meet a slack target for the estimated coupling capacitance timing run.

Slack is a difference between a time a signal takes to propagate along a net and an amount of time the signal is expected to take. Positive slack suggests that the signal propagated faster than expected whereas negative slack suggests the opposite. Thus, in FIG. 3, the baseline timing runs for nets A, B and C each have a positive slack of +800 picoseconds indicating that the signal propagated faster than expected. By contrast, the estimated coupling capacitance timing runs for nets A, B and C each have a negative slack of −200 picoseconds indicating that the signal propagated more slowly than expected.

The timing runs can be run on a testing apparatus 440 (see FIG. 4) to be described below that can be disposed in signal communication or otherwise coupled to the computing device. The testing apparatus 440 may include input and output latches 310 and 311, the nets A, B and C along with additional nets and combinational logic stages 320 that cooperate with the latches 310, 311 to delimit the individual nets from one another.

If, as a result of the timing runs, a net is found to meet its slack target for the estimated coupling capacitance timing run, where for example the amount of coupled capacitance is set with a K multiplier or factor of 2.5, it is assumed that no wiring isolation is ever going to be required for that net. With that said, if an option for wiring isolation is available by reason of their being extra wiring resources it is understood that nets not requiring isolation can still be isolated. Generally, about 80% of nets are found to not require isolation. If a net fails to meet its slack target in the baseline timing run, it will need to be fully isolated. Finally, if a net meets its slack target for the baseline timing run, but fails to meet its slack target for the estimated coupling capacitance timing run, a certain percentage of the wiring segments of that net should be isolated from adjacent nets or wires. The percentage can be described by the following equation used to extrapolate the amount of isolation necessary to arrive at a desired slack target for a particular net:

PIR=((Slack *K*−Slack *T*)/(Slack *K*−Slack *B*)),

Where PIR is the partial isolation ratio, Slack K is the slack value for the net during the estimated coupling capacitance timing run, Slack T is the slack target and Slack B is the slack from the baseline timing run. Typically, Slack B should be greater than or equal to the Slack T and greater than or equal to the Slack K in order for a tested net to be a candidate for partial isolation.

With reference to FIG. 3, the equation given above suggests that 40% of the nets A, B and C should be isolated from adjacent nets or wires.

In accordance with embodiments of the invention, partial isolation of nets can be achieved in various manners. In an example, those nets that should be fully or partially isolated are initially fully wired such that they take up three adjacent wiring tracks as shown in the "Case B" example of FIG. 2. Once the full wiring is completed, a certain percentage of wiring segments, such as 100% for fully isolated nets and 40% in the example of FIG. 3, would be modified back to single wide wire segments. The additional wiring material is then available for later use. In another embodiment, the nets may be initially wired with full, partial or no isolation in accordance with the determinations made as described above so that achieving the required level of isolation can be completed in a single stage wiring operation.

In further embodiments of the invention, the fully isolated and partially isolated nets are wired first. In this way, the nets that are the most likely to be affected by coupled capacitance would be assured priority access to their most optimal tracks where, for example, noise from adjacent tracks is limited or non-existent. Once the fully isolated and partially isolated nets are wired, the rest of the nets are wired.

A net that is found to require partial isolation can be isolated along any portion of its length. However, in accordance with embodiments of the invention, it is understood that isolating the portion of the net closest to an expected source of coupled capacitance, noise or some other form of interference will have a larger effect on net timing than isolation of a remote portion. In further embodiments, isolation is achieved at any portion of the net in view of wiring resources and wiring decisions related to other nets.

In accordance with aspects of the invention, a system for conducting circuit design employing the methods described above may be provided with the methods being conducted on a continuing and/or repeatable basis. That is, a circuit schematic may be defined with an initial configuration that is continuously or repeatedly modified by the testing, wiring, retesting and re-wiring of its individual nets. In this way, determinations about how and where to isolate nets or portions thereof can be made and consideration may also be given to the possibility that those determinations could later effect the operation of other nets. Over time, the configuration of the circuit schematic may be re-configurable in increasingly efficient ways. The configuration of the circuit schematic can therefore be improved upon in terms of the number of its nets that meet or exceed target slack even under maximum coupled capacitance conditions.

In accordance with further aspects of the invention, a computer readable medium is provided and has executable instructions stored thereon. When executed, the executable instructions instruct a processor of a computing system to execute the methods described above.

Figure 4:
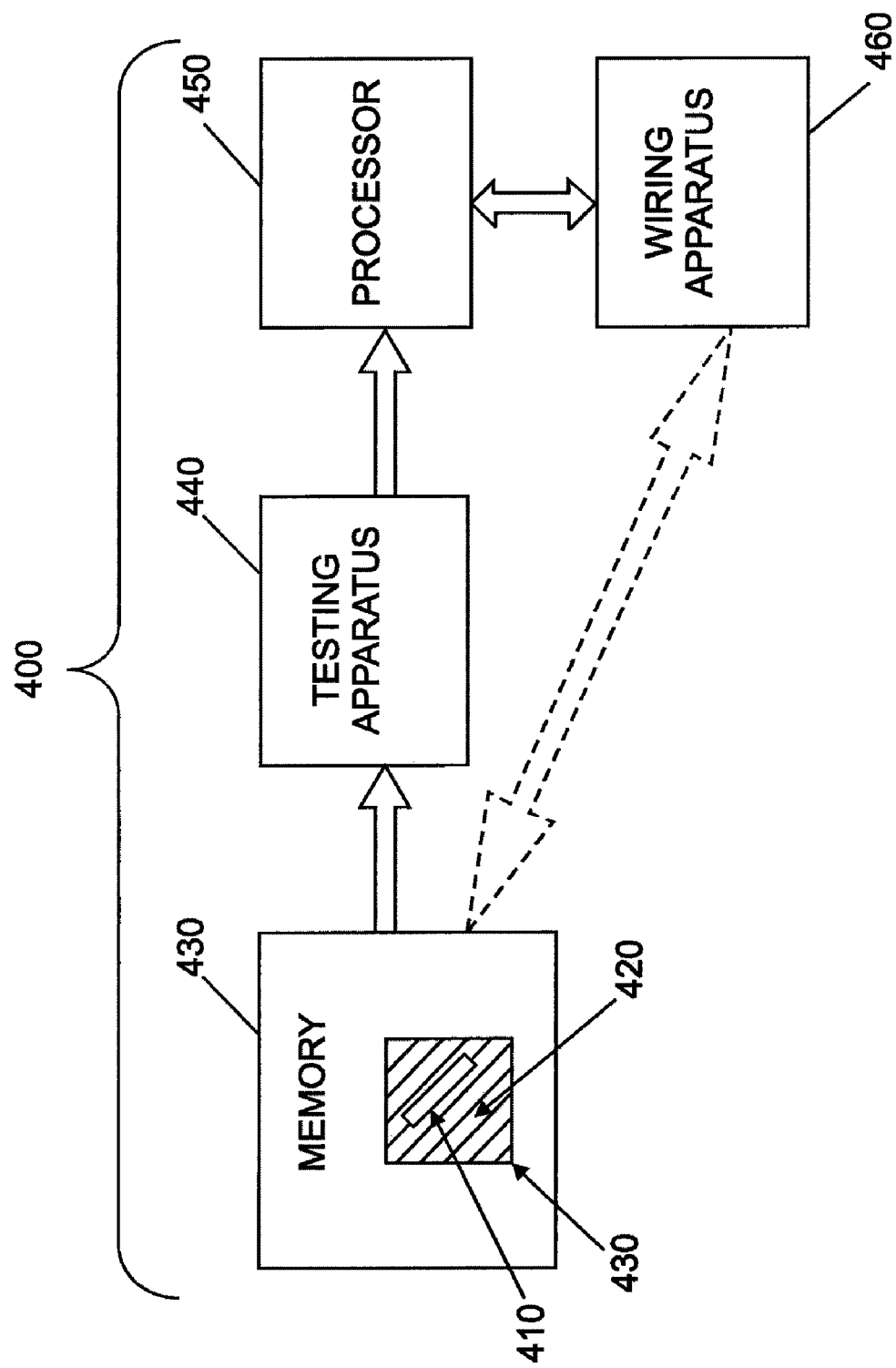
FIG. 4 is a schematic illustration of a system to execute a method to partially isolate a net of a circuit design in accordance with embodiments of the invention.

With reference to FIG. 4 and, in accordance with further aspects of the invention, a system 400 to execute a method to at least partially isolate a net 410 of a circuit design 420 is provided. The system 400 includes a memory 430, a testing apparatus 440 and a processor 450. The memory 430 may include read-only memory (ROM), random access memory (RAM) or other suitable forms of memory and may provide storage capacity on which a schematic 431 of the circuit design 420 and the net 410 is stored. The testing apparatus 440 may include the input and output latches 310 and 311, the nets A, B and C along with additional nets and the combinational logic stages 320, as described with reference to FIG. 3 above. The testing apparatus 440 may be configured to conduct the first and second or baseline and estimated coupling capacitance timing runs of the net 410 while respectively applying first and second or default and estimated amounts of coupled capacitance relative to the net 410. The processor 450 is coupled to the testing apparatus 440 to be receptive of results of the baseline and estimated coupling capacitance timing runs and is configured to determine whether and to what degree the net 410 is to be isolated based upon a comparison of the results, as described above. The system 400 may further include a wiring apparatus 460 coupled to the processor 450. The wiring apparatus 460 may wire and/or re-wire the net in accordance with determinations outputted by the processor 450. Moreover, with the net being wired and possibly re-wired, the schematic 431 may also be updateable subsequent to the wiring and re-wiring.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method to at least partially isolate a net of a circuit design, the method comprising:
    using a computing device to:
    test a timing characteristic of a circuit design by executing first and second timing runs, the first timing run applying a first amount of coupled capacitance relative to the net, and the second timing run applying a second amount of coupled capacitance relative to the net;
    identify from a result of the testing the net of the circuit design to be at least partially isolated from an adjacent net based on a comparison of the first and second timing runs; and
    determine that full isolation is necessary in an event the net fails to meet a slack target for the first timing run and that partial wiring isolation is necessary in an event the net meets a slack target for the first timing run and fails to meet a slack target for the second timing run.

2. The method according to claim 1, further comprising using the computing device to implement the at least partial isolation of the identified net.

3. The method according to claim 1, wherein the use of the computing device is to determine an estimated percentage of a length of the identified net to be partially isolated.

4. A method to at least partially isolate a net of a circuit design, the method comprising:
    conducting at a testing apparatus of a computing device a first timing run of the net while applying a first amount of coupled capacitance relative to the net;
    conducting at the testing apparatus a second timing run of the net while applying a second amount of coupled capacitance relative to the net; and
    determining at a processor of the computing device whether and to what degree the net is to be isolated based upon a comparison of the first and second timing runs,
    wherein the determining comprises determining that full wiring isolation is necessary in an event the net fails to meet a slack target for the first timing run and that partial wiring isolation is necessary in an event the net meets a slack target for the first timing run and fails to meet a slack target for the second timing run.

5. The method according to claim 4, wherein the first amount of coupled capacitance models a coupled capacitance of a single net adjacent to the net.

6. The method according to claim 4, further comprising recording the result of the first timing run.

7. The method according to claim 6, wherein the recording comprises using Steiner wired timing data.

8. The method according to claim 4, wherein the second amount of coupled capacitance models a coupled capacitance of two nets adjacent to the net.

9. The method according to claim 4, wherein the second amount of coupled capacitance models an estimated amount of coupled capacitance relative to the net in accordance with the circuit design.

10. The method according to claim 4, further comprising recording the result of the second timing run.

11. The method according to claim 4, wherein the determining comprises determining that no wiring isolation is necessary in an event the net meets a slack target for the second timing run.

12. The method according to claim 4, further comprising wiring the net fully and with single-wide wiring segments in accordance with the determination.

13. The method according to claim 4, further comprising:
    wiring the net fully; and
    changing a percentage of the fully wired net to single-wide wiring segments in accordance with the determination.

14. The method according to claim 4, further comprising:
    wiring the nets to be fully isolated first; and
    wiring the nets to be partially isolated second.

15. A non-transitory computer readable medium having executable instructions stored thereon, which, when executed, instruct a processor of a computing system to execute a method comprising:
    conducting a first timing run of the net while applying a first amount of coupled capacitance relative to the net;
    conducting a second timing run of the net while applying a second amount of coupled capacitance relative to the net; and
    determining at a computing device whether and to what degree the net is to be isolated based upon a comparison of the first and second timing runs; and
    wherein the determining comprises determining that full wiring isolation is necessary in an event the net fails to meet a slack target for the first timing run and that partial wiring isolation is necessary in an event the net meets slack target for the first timing run and fails to meet a slack target for the second timing run.

16. A system to at least partially isolate a net of a circuit design, the system comprising:
   a testing apparatus conductive of first and second timing runs of the net while respectively applying first and second amounts of coupled capacitance relative to the net; and
   a processor, coupled to the testing apparatus to be receptive of results of the first and second timing runs, by which a comparison of the results and determinations based upon the comparison as to whether and to what degree the net is to be isolated are made,
   wherein the processor determines that full isolation of the net is necessary in an event the net fails to meet a slack tar et for the first timing run and that partial wiring isolation of the net is necessary in an event the net meets a slack target for the first timing run and fails to meet a slack target for the second timing run.

17. The system according to claim 16, wherein the testing apparatus comprises first and second latches disposable at input and output portions of the net, respectively.

18. The system according to claim 16, further comprising a wiring apparatus coupled to the processor to wire and/or re-wire the net.

* * * * *